Oct. 7, 1924.
J. E. CURTISS
1,510,980
AIR PRESSURE REGULATOR
Filed Feb. 3, 1923
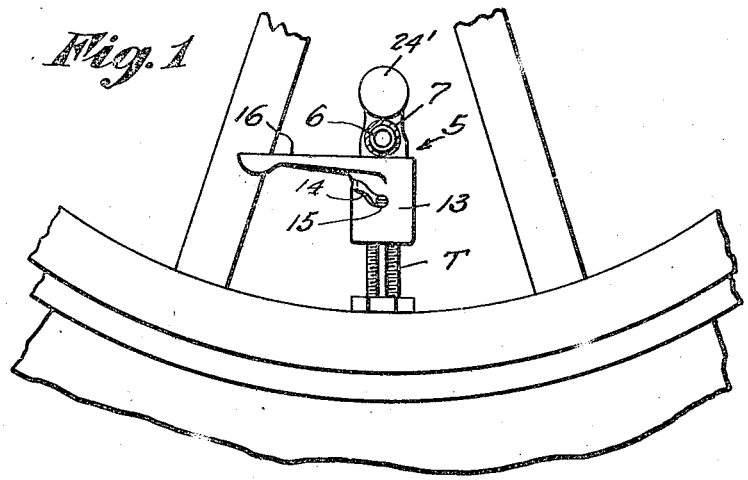
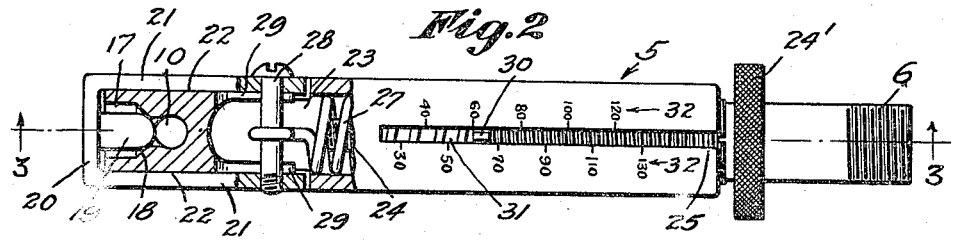
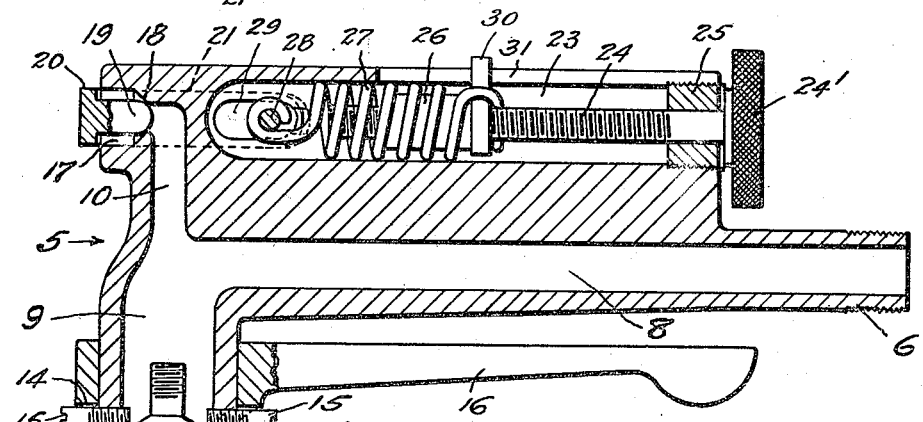
INVENTOR
Joseph E. Curtiss.
BY
Pierre Barnes
ATTORNEY Patented Oct. 7, 1924.

1,510,980

UNITED STATES PATENT OFFICE.

JOSEPH E. CURTISS, OF PORT ANGELES, WASHINGTON.

AIR-PRESSURE REGULATOR.

Application filed February 3, 1923. Serial No. 616,844.

*To all whom it may concern:*

Be it known that I, JOSEPH E. CURTISS, a citizen of the United States, residing at Port Angeles, in the county of Clallam and State of Washington, have invented certain new and useful Improvements in Air-Pressure Regulators, of which the following is a specification.

This invention relates to air-pressure regulating devices for use, more especially, in inflating pneumatic tires to predetermined pressures.

The object of my invention is the perfecting of devices of this general character to render the same more simple and efficient in operation and more convenient than others hitherto in use.

Other specific objects and advantages of the invention will appear in the following specification.

The invention consists in the novel construction, adaptation and combination of parts hereinafter described and claimed.

In the accompanying drawings,—

Figure 1 is a fragmentary side elevation of an automobile wheel having applied to the tire-valve a gage and blow-off device embodying the present invention. Fig. 2 is a top plan view, shown partly in horizontal section, of my improved device. Fig. 3 is a longitudinal vertical section through 3—3 of Fig. 2 of the device, applied to a tire-valve.

As illustrated in its preferred construction, my invention comprises a body 5 having at one end a nipple 6 adapted to be connected with a tube 7, Fig. 1, leading from a source or reservoir of air under pressure. Extending through said nipple is a passage 8 of the body 5 which communicates near the other end of the latter with branches 9 and 10. The branch passage 9 extends through a tubular boss 11 of said body and to which a tire-valve, indicated by T, is coupled by suitable means.

As illustrated, such means consists of a rubber bushing 12 engageable about the tire-valve and located between the outer extremity of said boss and peripheral flange 13¹ provided at the end of a hub 13 which is rotatably mounted upon said boss. The hub 13 is furthermore connected to said boss for relative axial movements by the provision in the hub of helically disposed slots 14 to receive studs 15 engaging screw threaded holes provided in said boss at diametrically opposite sides thereof. By thus connecting the hub to the boss, turning the hub in one rotary direction or the other causes it to be retracted for compressing the bushing to engage the tire-valve to be advanced for allowing the bushing to elongate to disengage the device from the tire-valve. The hub 13 may advantageously be rotated by the provision thereon of an arm 16 to be revolubly turned by means of the operator's finger.

The branch passage 10 has an outlet 17 to the atmosphere exteriorly of the body. Included in said outlet is a seat 18 for a pressure relief valve in the nature of a plug valve 19 which is formed integral with a substantially U-shaped stirrup 20 having its arms 21, see Fig. 2, disposed in guide-ways 22 provided in opposite sides of the body.

Said body is provided with a substantially cylindrical chamber 23 arranged in axial alignment with the valve 19.

A screw threaded rod 24, hereinafter designated as the regulating screw, extends axially through an adjustable guide 25 into the chamber 23 to engage an internally threaded collar or nut 26 provided within said chamber.

27 represents an extensible spiral spring having one of its ends connected to a transversely arranged bolt 28 which extends through slots 29 of the body and secured to the stirrup arms 21. The spring 27 serves to yieldingly retain the relief valve 19 in its closed relations with respect to its seat 18.

The nut 26 is provided with a pointer element 30 extending into a slot 31 of the body to serve as a pressure indicator with respect to a scale or scales, denoted by 32, of numbers signifying the position at which the nut is to be set by said regulating screw to adjust the spring 27 to allow the valve 19 to unseat when a predetermined number of pounds of air pressure occurs in the air passages of the device.

The nut regulating screw 24 is rotated by the provision thereon of a knurled head 24¹ which bears against the guide 25.

To accommodate the resistance due to friction and the power of the used spring of a tire-valve the device should be adjusted to have the relief valve thereof open responsive to a pressure slightly greater than that desired in a tire as indicated by the pointer 30 with respect to the gage marks.

The operation of the invention is as follows:

After the device has been clamped to a tire-valve by means of the coupling bushing 12 as above explained, the regulating screw 24 is rotated through the instrumentality of the head 24¹ to cause the nut 26 to be brought into position to present the pointer 30 at the number on a scale 32 corresponding to the pressure to which it is desired to inflate a tire.

Assuming a tire pressure of 60 pounds is desired, the nut 26 is moved by the regulating screw 24 to have the pointer 30 register with the scale mark "60" which will cause the spring 27 to be at such a tension that it will permit the relief valve to be unseated for the escape of air from the device when the air pressure therein slightly exceeds 60 pounds to which a tire is to be inflated.

The relief valve accordingly is unseated by air pressure to prevent the inflation of a tire by a pressure exceeding that for which the valve controlling spring is regulated predeterminately by the gage.

While I have illustrated the device in its construction now preferred by me, I do not wish to be understood as limiting myself specifically thereto as changes may be made in the sizes, proportions and arrangement of parts without departing from the spirit of my invention within the scope of the appended claim.

What I claim, is,—

In an air pressure regulator of the character described, having a body provided with a chamber having slots in its peripheral wall, and an air passage in the body provided with an air exhaust outlet, a valve for the latter, a spring provided in said chamber, operative connections between one end of said spring and the valve, said connections including a stirrup member outside of the body and a member extending through said slots and operatively connecting said spring to said stirrup member, and means for regulating predeterminately the effective power of said spring.

Signed at Port Angeles, Washington, this 16th day of January, 1923.

JOSEPH E. CURTISS.

Witnesses:
R. J. YOUNG,
WILL H. TAYLOR.